United States Patent Office 3,669,726
Patented June 13, 1972

3,669,726
SYNTHETIC ORGANIC FIBER RESISTANT
TO YELLOWING
Edgar Karl Tinder, Powhatan, Va., assignor to E. I. du
Pont de Nemours and Company, Wilmington, Del.
No Drawing. Filed Aug. 13, 1969, Ser. No. 849,904
Int. Cl. B32b 27/34, 27/14
U.S. Cl. 117—138.8 N  3 Claims

ABSTRACT OF THE DISCLOSURE

Polyamide and other synthetic polymeric fibers of increased whiteness and reduced tendency to yellow are obtained by coating the same with defined amounts of discrete particles of carbon black of colloidal size.

BACKGROUND OF THE INVENTION

Shaped polyamides and many other fibers of the prior art suffer from a tendency to yellow when subjected to high temperatures and/or when exposed to certain atmospheric conditions. This is often noted in many articles of commerce containing exposed polyamide filaments such as ropes designed for use on boats and ships.

It is known as shown by Foster et al. U.S. 2,875,171 that the weather resistance of polymeric materials may be enhanced by incorporating finely-divided carbon therein. Prior art methods of using carbon black to retard weathering suffer from being costly. They may involve drastic mechanical stirring or working of viscous masses and leave undesirable bubbles in the final product. Moreover, the black color imparted to products such as ropes renders these techniques undesirable to the consumer.

DETAILED DESCRIPTION OF THE INVENTION

The present invention is directed to an organic textile fiber containing a small amount of carbon black as a surface coating which fiber exhibits a surprising degree of resistance to yellowing.

The particulate carbon black to be used as the surface coating should be of colloidal size. It should be added in amounts sufficient to provide a textile fiber bearing from about $7.0 \times 10^{-5}\%$ to $4 \times 10^{-3}\%$ by weight of the carbon black on its surface. Preferably, the fiber should contain about $5 \times 10^{-4}\%$ carbon black. Carbon black having an average particle diameter of from about 10 millimicrons to about 70 millimicrons is suitable in the practice of this invention. The particle size may be measured by the electron microscope.

Although it is possible o apply the carbon black directly to the fibers in the form of an aqueous dispersion which may contain a suitable dispersing agent for the carbon black, it is preferable to add the carbon black to a conventional textile finish composition known in the art and then to coat the fiber with the finish composition. The carbon black may be added to the finish in powder form or in aqueous dispersion, the latter being preferred to insure adequate distribution of carbon black particles in the finish. The textile finish compositions used for this purpose may be water-base or oil-base finishes. They are conventionally applied to the surface of the yarn to lubricate, to give them antistatic properties, or to insure good adhesion of cords to rubber stocks such as tires and conveyor belts, etc. Typical ingredients of such finishes comprise quaterary ammonium salts, phosphates, esters and ethers having organic long-chain fatty constituents, phenolic compounds, ethylene oxide compounds, the natural and synthetic oils and waxes such as coconut oil, paraffin wax, polysiloxanes, and many others. The finishes may also contain effective amounts of biocides, fungicides, antioxidants, etc. These finishes or combinations thereof are usually applied to the surface of fibers by running the fibers in sliding contact with a roller which dips into the finish bath. In general, sufficient finish is applied to the yarn to give it a residual coating amounting to from about 0.1% to about 4% of the weight of the yarn and coating, with the residual coating containing from about 0.005% to 0.5% of carbon black. Preferably, with an anticipated finish level of about 1%, the finish would contain about 0.05% carbon black.

The fiber should be coated with an amount of carbon black sufficient to retard yellowing but not enough to cause visual grayness of the fiber. In determining the optimum amount of carbon black for the final yarn, considerations will be given to the color of the supply yarn, the type of finish used, and the nature of the dispersing agent.

Suitable aqueous colloidal dispersions of carbon black are the Aquablaks and the Low Color Furnace Blacks of the Molacco® type available from Columbian Carbon Company, Haddonfield, N.J. These aqueous dispersions have a pH of about 10 and contain nonionic or anionic dispersing agents. Preferably, the carbon black powder should have a soft lubricating feel when rubbed between the fingers as opposed to a harsh gritty feel.

Among the filaments which normally tend to yellow with age and are susceptible to improvement through practice of the present invention are those made of synthetic linear polycarbonamides such as polyhexamethylene adipamide (66 nylon), melt blends and copolymers thereof, synthetic linear polyesters such as poly(ethylene terephthalate) and copolymers thereof, polyacrylonitrile, and others. In particular, the present invention is of advantage with polycarbonamides. The preferred embodiment is a polyhexamethylene adipamide bearing the requisite amount of finely-divided carbon black.

All parts and percentages used herein are parts by weight and percentages by weight, unless otherwise stated.

The term "relative viscosity" (RV) as used in Example I which follows is the ratio of absolute viscosity at 25° C. (in centipoises) of the solution of synthetic linear polyamide in 98% formic acid (2% water and 98% formic acid) to the absolute viscosity at 25° C. (in centipoises) of the 98% formic acid. An 8.4% (by weight) solution of the synthetic linear polyamides which are completely soluble in 98% formic acid is used in this determination. In the remaining examples 90% formic acid and 10% water solutions are used for RV determinations.

The degree of yellowness of the yarn is measured in the examples which follow by use of a "Hunterlab Color Difference Meter," Model D-25, available from Hunter Associates Laboratory, Inc., 9529 Lee Highway, Fairfax, Va. In principle, the sample is illuminated by a highly randomized light source and the light reflected from the sample is measured with phototubes. The instrument is used to measure the $b$ coordinate which shows the amount of yellowness of the sample when the $b$ value is plus and the blueness of the sample when the $b$ value is minus. As the yarn becomes yellower, the $b$ value rises. In preparing the sample, sufficient yarn is parallel-wound onto a 5-inch square piece of stiff flat cardboard to cover the surface of the cardboard. The sample is placed flat on the instrument and is exposed to the light. Reference is made to ASTM Designation: D-2244-68 for this test.

Example I

A 140-filament/840-denier nylon yarn is produced by spinning a melt blend of polyamides at about 300° C. through 140 round orifices of a spinneret. The melt blend (68 RV) comprises polyhexamethyleneisophthalamide (13% by weight) and polyhexamethyleneadipamide and contains copper 8-hydroxyquinolate (antioxidant) in an amount of about 32 p.p.m. copper. The filaments are withdrawn from the spinneret at about 560 yards/minute and are given a coating of spin finish comprising (a) refined coconut oil (about 68 parts by weight), (b) the tetraoleate-laurate pentaester of the condensate of one mole of sorbitol with about 30 moles of ethylene oxide as taught in U.S. 3,421,935 (about 20 parts by weight), (c) the condensate of one mole of sorbitol with 40 moles ethylene oxide and 7 moles oleic acid (about 10 parts by weight), (d) orthophenylphenol (about 1.8 parts by weight), and (e) the low temperature condensation product of acetone and diphenylamine (commercially available as Aminox®) (about 2 parts by weight). The finish level on yarn is about 1.8%, based on the weight of the yarn containing the finish. The filaments are then drawn 5.4×, in two stages, over a 3-inch-diameter hot tube at 180° C., annealed at 225° C. (hot air) over hot rolls, and thereafter relaxed at high temperature, the drawing, annealing, and relaxing being substantially as taught in U.S. 3,311,691. The yarn is then wound onto a package according to customary procedures. Approximately 170 ends of this yarn are withdrawn from their respective packages and wound onto a beam. The filaments are withdrawn from the beam as 2520-denier (3 ply, 840 denier per ply) yarns and slashed at 170 yards per minute on a conventional slasher having a water-bath temperature of 45° C. Fresh water supply to the water bath is 12 gal./minute and dry-drum temperature is 130° C. The yarns are coated with a 20% aqueous emulsion of carbon-black-containing overlay finish to a level of about 0.6% nonaqueous ingredients, based on the weight of the yarn containing the finish, as they are withdrawn from the drying drums of the slasher. The non-aqueous portion of the overlay finish is substantially as described in Example I of U.S. 3,386,938 with the exception that it contains no 2-(2'-hydroxy-5'-methylphenyl) benzotriazole or 2,2'-thiobis-(4-methyl-6-tertiarybutylphenol). However, it contains 0.12% of carbon black from Aquablak G which is an aqueous dispersion comprising 50% furnace carbon black having an average particle size of about 62 m$\mu$ and a nonionic dispersing agent. The yarns are then wound onto a second beam and thereafter wound onto a paper tube. Surprisingly, the yarns do not appear gray but have a white-than-normal appearance, and, more surprisingly, after ageing in a storage cabinet for 4 months they appear to be even whiter than before. The yarns have a tenacity of about 8.6 grams per denier and an elongation-at-break of about 19%. The yarns are highly suitable for processing into nylon ropes. The amount of carbon black on the final yarn is about $7.2 \times 10^{-4}$ percent by weight.

Example II

Example I is repeated with the following exceptions: The polymer is polyhexamethylene adipamide of 70 RV and contains an effective amount of antioxidant, copper acetate and potassium iodide, as shown in U.S. 2,705,227. Spinning speed is 520 y.p.m. and spinning temperature is 300° C. The fibers are drawn in two stages as in Example I to 5.3×, and annealed at 225° C. over hot rolls and thereafter relaxed at high temperature as in Example I. The spin finish is the same as in Example I with the exception that Aminox® is omitted. The water bath temperature of the slasher is about 90° C. instead of 45° C. The yarn is coated as it leaves the dry drums, with an overlay finish composition identical to the overlay finish of Example I with the exception that the finish contains 0.1% of carbon black from Aquablak M instead of 0.12% of carbon black from Aquablak G. Aquablak M is an aqueous dispersion comprising 50% Low Color Furnace Carbon Black of the Molocco® type having an average particle size of about 62 m$\mu$ and an anionic dispersing agent. Finish level is about 0.6% of non-aqueous ingredients based on the weight of the yarn plus the weight of the finish. The yarn is then wound onto a beam and thereafter wound on a tube. The yarn has a tenacity of about 9.2 grams/denier and elongation-at-break of about 20%. b value is +4.2 as compared to a control sample, produced in the same manner but containing no Aquablak, which has a b value of +5.6. The test yarn appears to be whiter than the control on visual observation. Normally, a 1.0 unit difference in b value is detectable with the naked eye. The yarn is an excellent cordage yarn. The amount of carbon black on the final yarn is about $6.0 \times 10^{-4}$ percent by weight.

Example III

Example II is substantially repeated with the following exceptions: The yarn is not slashed and the spin finish contains an antioxidant amount of 4,4'-butylidene bis (6-t-butyl-m-cresol). The spin finish level is 1.0% based on the weight of the yarn plus the weight of the finish, and the overlay finish contains only 0.07% carbon black from Aquablak M. Finish level for the overlay is 0.7% instead of 0.6%. b value of the finished yarn is only +3.9. The amount of carbon black on the final yarn is about $4.9 \times 10^{-4}$ percent by weight.

Example IV

Example II is repeated with the following exceptions: The spin finish is as in Example III except the spin-finish level is 1.5% instead of 1.0%; the yarn is slashed and the water-bath temperature is 65° C. The overlay finish comprises a mixture of 87.5 parts of No. 50 white oil, 2 parts aluminum monopalmitate, 10 parts of oxidized polyethylene (2500 M.W.), and 0.5 part 2,2'-thiobis(4-methyl-6-tertiarybutylphenol) and contains 0.015% of carbon black from Aquablak M. Overlay finish level is 2.7% based on the weight of the yarn plus the weight of the finish. b value for the test yarn is +5.2. A control sample made substantially identically has a b value of +6.3. After three weeks ageing under fluorescent light, the b value of the test is +4.9 and, after 7 weeks similar ageing, it is +4.0; corresponding values for the control are +6.4 and +5.1. The amount of carbon black on the final yarn is about $4.0 \times 10^{-4}$ percent by weight.

Example V

A 175-filament/1050-denier nylon yarn is produced by melt-spinning polyhexamethylene adipamide of 61 RV and containing the antioxidant of Example II, at 300° C. through 175 round orifices of a spinneret. The filaments are withdrawn from the spinneret at about 570 yards/min. and drawn in two stages, as taught in U.S. 3,091,015, 5.1× over a 3-inch diameter hot tube at 175° C. and wound on a package. The yarn is given no annealing treatment immediately after drawing. The spin finish is identical to the spin finish of Example II except that it contains 0.05% Molacco® black powder which is a furnace carbon black having an average particle size of about 62 m$\mu$. Finish level is about 2% based on the weight of the yarn plus the weight of the finish. The yarn is highly suitable for industrial applications. The yarn has a b value of +4.0 as compared to a control yarn having no carbon, which has a b value +4.4. The amount of carbon black on the final yarn is about $1 \times 10^{-3}$ percent by weight.

The example is repeated with the exception that 0.1% of the carbon powder is used in the spin finish instead of 0.05%. The b value is +3.6. The amount of carbon black on the final yarn is about $2 \times 10^{-3}$ percent by weight.

Example VI

Example II is repeated with the following exception: The overlay finish contains 0.1% carbon black from Aquablak MA3745–D instead of Aquablak M. Aquablak MA3745–D, available from Columbian Carbon Company referred to above, is an aqueous dispersion comprising 45% carbon black of the Raven® 30 type with an average particle size of about 27 m$\mu$. The final yarn has a b value of +4.3 as compared to a b value of +5.6 for a control sample produced in the same manner but containing no Aquablak. The amount of carbon black on the final yarn is $6 \times 10^{-4}$ percent.

Example VII

The supply yarn is the same as in Example V with the exception that the spin finish contains no carbon black and it is a 1260-denier/210-filament yarn istead of 1050-denier/175-filament yarn. The unslashed yarn is overlaid with 1.5% of the overlay finish of Example IV with the exception that a small amount of 2,2'-thiobis(4,6-dichlorophenol) and 3,5-dimethyltetrahydro 1,3,5,2H-thiadizaine 2-thione are added as fungicide and biocide. This finish contains 0.01% of Molacco® carbon powder $b$ value for this yarn is $+2.8$ as compared to a control yarn containing no carbon having a $b$ value of $+3.3$. The amount of carbon black on the test yarn is $15 \times 10^{-5}$ percent.

What is claimed is:

1. Synthetic organic fiber of increased whiteness and reduced tendency to yellow, bearing on its surface, from about $7.0 \times 10^{-5}$ percent to about $4 \times 10^{-3}$ percent by weight of discrete particles of carbon black of colloidal size.

2. The article of claim 1 wherein the fiber is a polycarbonamide.

3. The article of claim 2 wherein the fiber is polyhexamethylene adipamide.

References Cited

UNITED STATES PATENTS

| | | | |
|---|---|---|---|
| 2,427,979 | 9/1947 | Sorensen | 117—160 AX |
| 2,734,834 | 2/1956 | Rainard | 117—138.8 N |
| 2,875,171 | 2/1959 | Foster et al. | 260—17.5 |
| 2,920,978 | 11/1960 | Randall | 117—33.3 |
| 2,928,754 | 3/1960 | Schappel | 117—139.5 C |
| 2,999,774 | 9/1961 | Schappel | 117—139.5 C |
| 3,039,349 | 6/1962 | Rogers | 117—33.3 |
| 3,281,260 | 10/1966 | Ucci | 117—33.3 |
| 3,309,219 | 3/1967 | Etherington | 117—33.3 |
| 3,506,470 | 4/1970 | Young et al. | 117—33.3 |

WILLIAM D. MARTIN, Primary Examiner

R. HUSACK, Assistant Examiner

U.S. Cl. X.R.

117—16, 33.3, 138.8 F, UA, R, 139.5 R, 160 A, 169 R, 226; 252—8.6